United States Patent
Turner et al.

(10) Patent No.: US 10,281,584 B2
(45) Date of Patent: May 7, 2019

(54) RECEIVER AND METHOD FOR DIRECT SEQUENCE SPREAD SPECTRUM SIGNALS

(71) Applicant: AIRBUS DEFENCE AND SPACE LIMITED, Hertfordshire (GB)

(72) Inventors: Michael Turner, Hertfordshire (GB); Kwok Mak, Hertfordshire (GB)

(73) Assignee: AIRBUS DEFENCE AND SPACE LIMITED, Hertfordshire (GB)

( * ) Notice: Subject to any disclaimer, the term of this patent is extended or adjusted under 35 U.S.C. 154(b) by 480 days.

(21) Appl. No.: 14/896,650

(22) PCT Filed: Jun. 5, 2014

(86) PCT No.: PCT/GB2014/051738
§ 371 (c)(1),
(2) Date: Dec. 7, 2015

(87) PCT Pub. No.: WO2014/195712
PCT Pub. Date: Dec. 11, 2014

(65) Prior Publication Data
US 2016/0116599 A1 Apr. 28, 2016

(30) Foreign Application Priority Data
Jun. 5, 2013 (EP) .................................. 13275134

(51) Int. Cl.
*G01S 19/29* (2010.01)
*G01S 19/30* (2010.01)

(52) U.S. Cl.
CPC .............. *G01S 19/29* (2013.01); *G01S 19/30* (2013.01)

(58) Field of Classification Search
CPC ..................................................... G01S 19/29
(Continued)

(56) References Cited

U.S. PATENT DOCUMENTS 4,578,678 A   3/1986   Hurd
5,271,034 A * 12/1993  Abaunza ............... G01S 19/243
                                                  342/357.62
(Continued)

FOREIGN PATENT DOCUMENTS

EP    1 143 674 A2    10/2001

OTHER PUBLICATIONS

International Search Report and Written Opinion in PCT International Application No. PCT/GB2014/051738, dated Sep. 22, 2014.
(Continued)

*Primary Examiner* — Vladimir Magloire
*Assistant Examiner* — Helena H Seraydaryan
(74) *Attorney, Agent, or Firm* — Scarinci Hollenbeck

(57) ABSTRACT

A received Direct Sequence Spread Spectrum DSSS signal is processed by performing DSSS acquisition to obtain estimates of a frequency offset and a spreading code phase, sequentially obtaining, for each one of a plurality of segments of a received DSSS signal, a correlation function between the DSSS signal segment and a replica of a spreading code by using a Time and Frequency Transform based correlation method, the estimated frequency and the spreading code phase, and performing DSSS carrier tracking by tracking the phase of a correlation peak in the obtained correlation functions, and applying phase corrections to the obtained correlation functions to provide fine Doppler compensation. The time and frequency transform based correlation method involves, for each segment of the received DSSS signal, obtaining a plurality of samples and transforming the samples from the time domain to the frequency domain.

14 Claims, 9 Drawing Sheets

(58) Field of Classification Search
USPC .................................................. 342/357.68
See application file for complete search history.

(56) References Cited

U.S. PATENT DOCUMENTS

| | | | | |
|---|---|---|---|---|
| 6,407,699 | B1* | 6/2002 | Yang | G01S 19/21 342/357.59 |
| 7,257,153 | B2* | 8/2007 | Kontola | G01S 19/24 342/357.63 |
| 7,471,241 | B1* | 12/2008 | Yang | G01C 21/206 342/357.73 |
| 7,639,181 | B2* | 12/2009 | Wang | G01S 19/24 342/357.59 |
| 8,098,765 | B1* | 1/2012 | Beckmann | G01S 19/37 375/142 |
| 8,331,422 | B2* | 12/2012 | Weill | G01S 19/254 342/357.64 |
| 2001/0000216 | A1* | 4/2001 | Kober | H03M 1/121 341/155 |
| 2004/0138811 | A1* | 7/2004 | Teranishi | G01S 19/29 701/469 |
| 2008/0260086 | A1* | 10/2008 | Matsumoto | H04L 27/0014 375/373 |
| 2009/0219201 | A1* | 9/2009 | Martin | G01S 19/23 342/357.62 |
| 2012/0274512 | A1* | 11/2012 | Jokitalo | G01S 19/30 342/357.69 |
| 2015/0036724 | A1* | 2/2015 | Van Dierendonck | G01S 19/42 375/147 |

OTHER PUBLICATIONS

Brown et al., "Direct-sequence spread spectrum acquisition using transform domain processing," Military Communications Conference, Milcom 1993, vol. 3, Oct. 11, 1993, pp. 1018-1022, XP010142785.
Wang et al., "Two-stage FFT acquisition method of weak GNSS signals," IEEE 2012 2nd Conference on Computer Science and Network Technology, Dec. 29, 2012, pp. 1918-1921, XP032420205.

* cited by examiner

RECEIVER AND METHOD FOR DIRECT SEQUENCE SPREAD SPECTRUM SIGNALS

CROSS-REFERENCE TO RELATED APPLICATIONS

This application is a National Stage of International patent application PCT/GB2014/051738, filed on Jun. 5, 2014, which claims priority to foreign European patent application No. EP 13275134.8, filed on Jun. 5, 2013, the disclosures of which are incorporated by reference in their entirety.

TECHNICAL FIELD

The present invention relates to an apparatus and method for receiving and processing a Direct Sequence Spread Spectrum (DSSS) signal. More particularly, the present invention relates to processing a DSSS signal by obtaining a correlation function, for use in DSSS code and carrier tracking, using a time and frequency transform based correlation method.

BACKGROUND OF THE INVENTION

Direct Sequence Spread Spectrum (DSSS) modulation is used in a wide variety of applications, including Global Navigation Satellite Systems (GNSS), radio frequency ranging systems, radio frequency time transfer systems, anti-jamming receivers and channel sounding. A DSSS signal comprises a carrier wave that has been phase-modulated with a sequence of pseudonoise "chips", each chip having a much shorter duration than an information bit. The sequence of chips can be referred to as a spreading code. The information signal can be recovered from a received DSSS signal by multiplying the received DSSS signal with a replica of the spreading code. This demodulation process requires the replica spreading code to be accurately aligned in frequency and phase with the received DSSS signal.

To demodulate a received DSSS signal, a two-stage process is used. The first stage is acquisition, this involves establishing an initial estimation of the received spread signal frequency and the code phase. The initial estimates allow the replica spreading code to be aligned to within ±1 code chip. Then in the second stage, carrier tracking, the replica spreading code phase is more accurately synchronised to the received code phase to despread the received DSSS signal, and a Frequency Lock Loop (FLL) and Phase Lock Loop (PLL) accurately track the frequency and phase of the de-spread signal.

A conventional code tracking implementation is shown in FIG. 1, and includes a Delay Lock Loop (DLL) which performs correlations of the input signals with early (by a fraction of a chip), prompt (on time) and late (by a fraction of a chip) versions of the replica spreading code. In detail, as shown in FIG. 1, the code tracking apparatus receives an intermediate frequency (IF) signal, which is a down-converted received DSSS signal. The IF signal is mixed with sine and cosine waveforms generated by a carrier Numerically Controlled Oscillator (NCO) 101 to generate In-phase (I) and Quadrature (Q) components. The I and Q components are each correlated with the Early (E), Prompt (P), and Late (L) versions of the replica spreading code, generated by a code generator 102, and passed through Integrate and Dump (I&D) filters.

A DLL discriminator 103 outputs an error signal corresponding to the difference between the early and late correlator outputs, which gives an indicator of the loop error. The error signal is passed through a code filter 104 and used to drive the code generator 102 appropriately to synchronise the received signal with the replica code sequence.

Separate tracking loops are implemented in the time domain to track carrier frequency and phase which is required for data demodulation. In this example the loop discriminator is based on an ATAN function 105 and uses the prompt correlator as its input. The output of the ATAN function 105 is filtered in a carrier loop filter 106 and fed back to control the carrier NCO 101. A drawback of this design is that the code and carrier loops are tightly coupled, since the output of the DLL discriminator 103 in the code loop will be affected by changes in the carrier NCO frequency and phase caused by operation of the carrier loop.

Other drawbacks of the conventional code tracking approach include the requirement for a separate dedicated DLL, with associated frequency and phase tracking loops, per signal source to be tracked. Also, DLL operation is generally based on discriminators which operate on signal envelopes or powers, with the result that the loop action is a non-coherent averaging process.

In addition, modern satellite navigation signals are using more complex navigation signal formats, for example the Galileo System uses binary offset coding (BOC). For these waveform types a conventional DLL tracking loop as shown in FIG. 1 can also suffer from false lock due to tracking on a correlation side lobe, as well as impaired tracking accuracy in the presence of multipath interference.

The invention is made in this context.

SUMMARY OF THE INVENTION

According to the present invention, there is provided a method of processing a Direct Sequence Spread Spectrum DSSS signal, the method comprising: performing DSSS acquisition to obtain estimates of a frequency offset and a spreading code phase; sequentially obtaining, for each one of a plurality of segments of a received DSSS signal, a correlation function between the DSSS signal segment and a replica of a spreading code by using a time and frequency transform based correlation method with coarse Doppler compensation, the estimated frequency offset and the spreading code phase; and performing DSSS carrier tracking by tracking the phase of a correlation peak in the obtained correlation functions, and applying phase corrections to the obtained correlation functions to provide fine Doppler compensation, wherein the time and frequency transform based correlation method involves, for each segment of the received DSSS signal, obtaining a plurality of samples, performing a time to frequency transformation, multiplying the transformed samples by a complex conjugate of the time to frequency-transformed replica of the spreading code, and performing an inverse time to frequency transformation.

Performing DSSS carrier tracking can comprise obtaining code and carrier phase estimates, and the method can further comprise: obtaining an estimate of the spreading code phase variation over time based on the code and carrier phase estimates, using a curve fitting process. Estimating the spreading code phase over time using curve fitting can give enhanced performance in low signal to noise scenarios. The curve fitting can, for example, be applied using linear regression or a Kalman filter.

The receiver can be a GNSS receiver, and the method can further comprise: obtaining a plurality of pseudoranges using the obtained estimate of the spreading code phase over time; and processing the obtained pseudoranges in a navigation algorithm to obtain an estimated location.

The method can further comprise: receiving a plurality of DSSS signals from spatially separate signal paths; obtaining, for each of the received DSSS signals, the plurality of correlation functions; time-aligning the obtained correlation functions from different ones of the received DSSS signals; and summing the time-aligned correlation functions.

The method can further comprise: detecting a phase offset between the correlation peaks in two of the plurality of correlation functions; applying a phase rotation to one of the two correlation functions, to align the correlation peaks in the two correlation functions; and summing the peak-aligned correlation functions.

The method can further comprise: interpolating between phases of the correlation peaks in successive ones of the correlation functions, to obtain a fractional offset value; aligning the correlation peaks in the plurality of correlation functions based on the obtained fractional offset; and summing the peak-aligned correlation functions.

The DSSS receiver can be a Global Navigation Satellite System GNSS receiver comprising a plurality of receiving channels each arranged to track a DSSS signal received from a different one of a plurality of GNSS satellites, and the method can further comprise: sharing each of the transformed signal samples with each one of the plurality of receiving channels.

Obtaining each one of the plurality of correlation functions can comprise: obtaining data samples of the segment of the received DSSS signal; and zero padding the obtained data samples to increase a frequency resolution of the transformed domain based correlation method.

The time and frequency transform based correlation method can use a Fast Fourier Transform (FFT), a non-uniform discrete Fourier transform, discrete sine and cosine transforms, or a fractional Fourier transform.

Performing DSSS acquisition can comprise: obtaining a plurality of acquisition correlation functions; estimating a Doppler offset from changes in phase of the correlation peak within the obtained acquisition correlation functions; coherently summing the acquisition correlation functions based on the estimated Doppler offset; and determining that acquisition is successful if a correlation peak in the summed acquisition correlation function exceeds a predetermined threshold.

The received DSSS signal can be a phase shift keying PSK modulated signal, and the method can further comprise: obtaining a correlation function for each one of a plurality of data symbols in the received DSSS signal; estimating, for each one of the obtained correlation functions, a data polarity; removing the estimated data polarity from each of the obtained correlation functions; and summing the correlation functions for the plurality of data symbols, after removing the estimated data polarities.

The plurality of segments each can have a length less than a duration of one data symbol, and obtaining the correlation function for each one of a plurality of data symbols in the received DSSS signal can comprise: obtaining correlation functions for each one of a predetermined number of the segments; aligning the obtained correlation functions in phase, based on a Doppler estimate obtained during the DSSS acquisition; and summing the predetermined number of aligned correlation functions to obtain an integrated correlation function for said one of the plurality of data symbols.

The time and frequency transform based correlation method can include one or more operations in the frequency domain to perform accumulation over a plurality of forward transforms.

The time and frequency transform based correlation method can further comprise: loading the plurality of samples into a column matrix, wherein the time to frequency transformation is applied to each column of samples in the column matrix to obtain a frequency-transformed matrix; obtaining a phase matrix based on the phase estimate obtained during DSSS acquisition; applying the phase corrections and integrating in the frequency domain by multiplying the frequency-transformed matrix by the phase matrix and the complex conjugate of the frequency-transformed replica of the spreading code, to obtain an integrated matrix; and obtaining an integrated correlation function by applying the inverse frequency transformation to the integrated matrix.

The method can further comprise applying coarse Doppler correction by applying a phase rotation to the complex conjugate of the frequency-transformed replica of the spreading code.

According to the present invention, there is also provided a computer-readable storage medium arranged to store a computer program, which when executed, performs the method.

According to the present invention, there is further provided apparatus for receiving a Direct Sequence Spread Spectrum DSSS signal, the apparatus comprising: means for performing DSSS acquisition to obtain estimates of a frequency offset and a spreading code phase; means for sequentially obtaining, for each one of a plurality of segments of a received DSSS signal, a correlation function between the DSSS signal segment and a replica of a spreading code by using a time and frequency transform based correlation method with coarse Doppler compensation, the estimated frequency and the spreading code phase; and means for performing DSSS carrier tracking by tracking the phase of a correlation peak in the obtained correlation functions, and applying phase corrections to the obtained correlation functions to provide fine Doppler compensation, wherein the time and frequency transform based correlation method involves, for each segment of the received DSSS signal, obtaining a plurality of samples, performing a time to frequency transformation, multiplying the transformed samples by a complex conjugate of the time to frequency-transformed replica of the spreading code, and performing an inverse time to frequency transformation.

The means for performing DSSS carrier tracking can be arranged to detect a change in the phase and a code peak bin index of the correlation peak over time in the obtained correlation functions.

The DSSS signal can comprise a data signal modulated by a spreading code, performing DSSS carrier tracking can comprise inputting the phase of the correlation peak into a phase tracking loop arranged to correct a phase of the correlation function, and the method can further comprise recovering the data signal using in-phase and quadrature components of the correlation peak.

The correlation function may comprise a plurality of correlation samples distributed across a plurality of correlation bins.

BRIEF DESCRIPTION OF THE DRAWINGS

Embodiments of the present invention will now be described, by way of example only, with reference to the accompanying drawings, in which.

DETAILED DESCRIPTION

Figure 2:
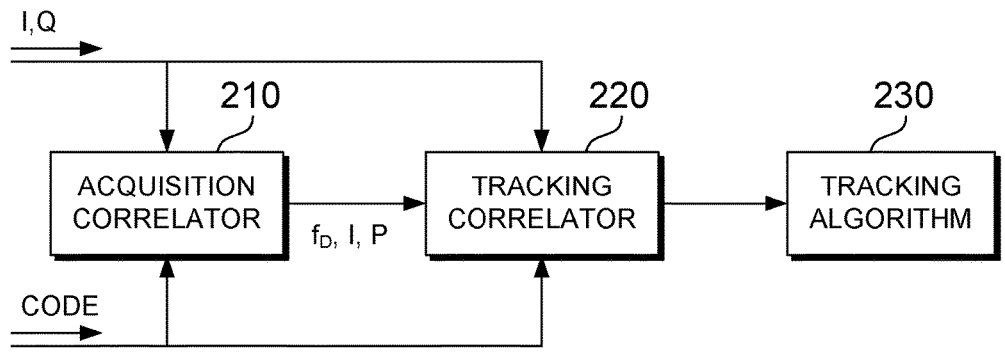
FIG. 2 illustrates apparatus for demodulating a DSSS signal, according to an embodiment of the present invention.
Figure 3:
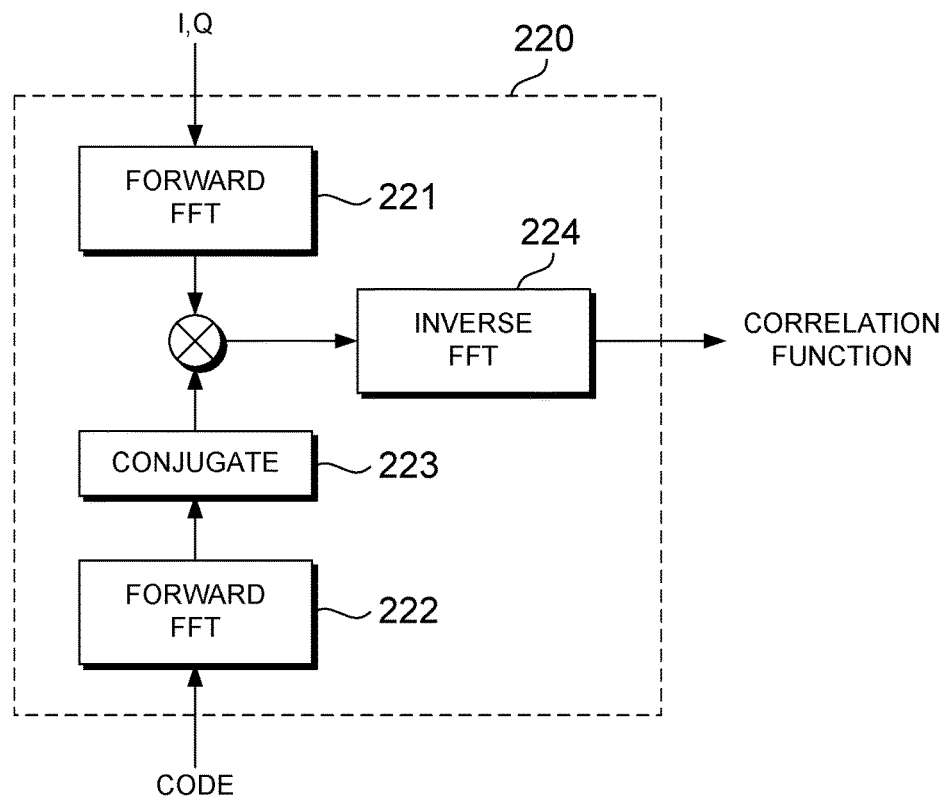
FIG. 3 illustrates apparatus for obtaining a correlation function, according to an embodiment of the present invention.

FIGS. 2 and 3 illustrate an apparatus for demodulating a DSSS signal, according to an embodiment of the present invention. The present embodiment uses a generalised time and frequency domain transform approach to perform coherent tracking of DSSS carriers, by using an estimated coherent complex correlation function as a source of phase information.

As shown in FIG. 2, the apparatus comprises a DSSS acquisition correlator 210, a DSSS tracking correlator 220, and a DSSS tracking algorithm 230. Although in the present embodiment separate acquisition and tracking correlators 210, 220 are shown, in other embodiments a single correlator may perform correlation for both acquisition and tracking processes. In general, any means for obtaining an acquisition correlation function and a tracking correlation function may be provided.

The acquisition correlator 210 and the tracking correlator 220 both receive I and Q samples of a received DSSS signal. For example, a DSSS receiver including the apparatus of FIG. 2 can further comprise an antenna arranged to receive a DSSS signal, an amplifier arranged to amplify the received DSSS signal, a down-converting module arranged to down-convert the amplified DSSS signal to an IF signal, and an analogue-to-digital converter (ADC) arranged to sample the IF signal and output digitised samples of the DSSS signal. The I and Q samples can be obtained from the ADC output samples by multiplying with local oscillator sine and cosine waveforms.

Also, as shown in FIG. 2 the acquisition correlator 210 and the tracking correlator 220 both receive samples of a replica spreading code. The samples of the replica spreading code can be stored in memory and retrieved when required for correlation, or can be generated on-demand by a pseudo-random number (PRN) code generator arranged to output the required PRN code for the signal source to be tracked, for instance a GNSS satellite.

In detail, the acquisition correlator 210 performs DSSS acquisition to obtain initial estimates of a frequency offset and a spreading code phase, by correlating the input I and Q samples to the code samples. Then, once acquisition has been performed, the tracking correlator 220 sequentially obtains, for each one of a plurality of segments of the received DSSS signal, a correlation function between the DSSS signal segment and the corresponding segment of the replica spreading code. The correlation functions are input to the DSSS tracking algorithm, which performs DSSS carrier tracking by comparing the position and phase of a correlation peak in one of the obtained correlation functions to a previous position and phase of the correlation peak. In this way, the DSSS tracking algorithm can monitor changes in the peak phase over time, in order to perform carrier and/or code phase tracking.

The tracking correlator 220 of the present embodiment exploits the fact that a correlation process is very similar to a convolution process, and that a convolution in the time domain is equivalent to a multiplication in the frequency domain. The estimated frequency and spreading code phase obtained during DSSS acquisition by the acquisition correlator 210 are input to the tracking correlator 220, which uses a Time and Frequency Transform based correlation method to obtain the correlation function. The Time and Frequency Transform based correlation method is similar to that used in a conventional GNSS receiver for DSSS acquisition, but in the present embodiment the correlation is performed during DSSS tracking and the correlation function is input to the tracking algorithm 230.

Figure 1:
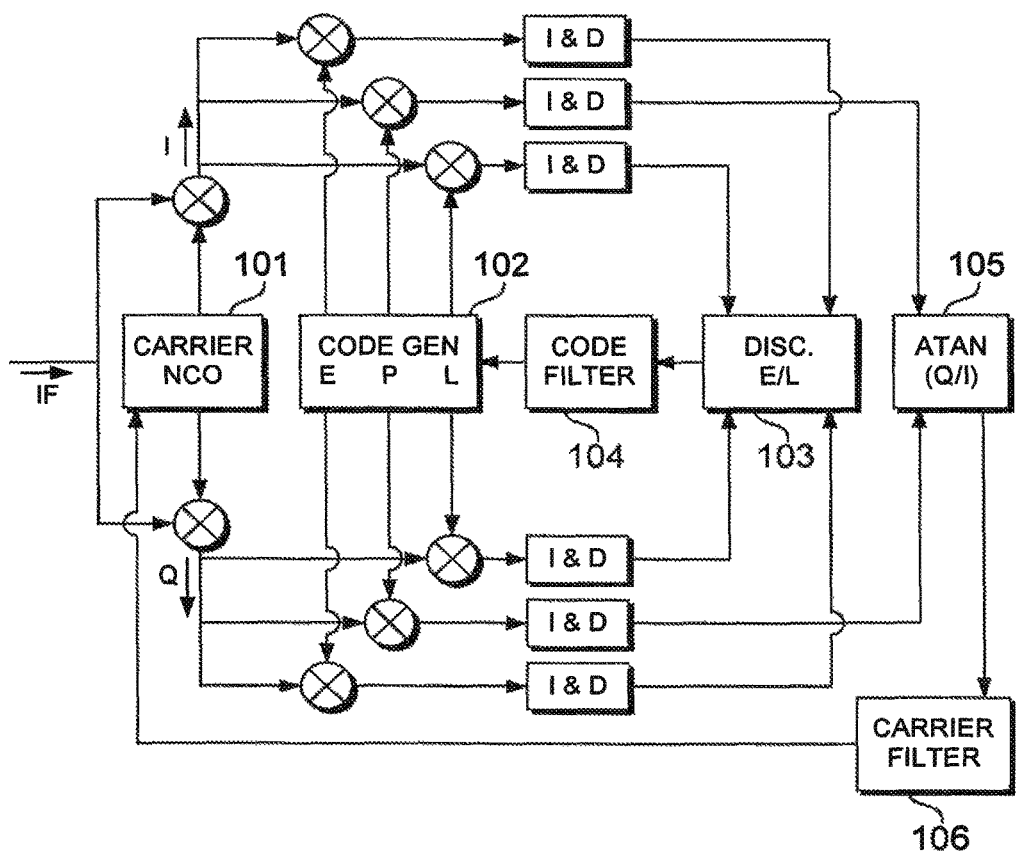
FIG. 1 illustrates a conventional apparatus for demodulating a DSSS signal.

The tracking algorithm 230 performs DSSS carrier tracking by tracking the phase over time of a correlation peak in the correlation functions received from the tracking correlator 220, and applying phase corrections to the obtained correlation functions to provide fine Doppler compensation. In this way, fine Doppler compensation is achieved by applying post-corrections after correlation has been performed. In contrast to a conventional tracking implementation such as the one shown in FIG. 1, which applies fine Doppler compensation before correlating the received signal with a replica spreading code, the approach used in the present embodiment means that the carrier loop and the primary correlation function are decoupled. This provides a more robust process that is less sensitive to carrier tracking estimates, allowing the receiver to track in very low signal to noise environments.

The tracking correlator 220 is shown in more detail in FIG. 3, and comprises a first forward Fast Fourier Transform (FFT) function 221, a second FFT function 222, and a complex conjugate function 223 arranged to provide the complex conjugate of the output of the second FFT 222. The I and Q samples from a predefined segment of the received DSSS signal are input to the first FFT 221, and the corresponding code samples are input to the second FFT 222. The first and second FFTs 221, 222 convert the I and Q samples and code samples, respectively, from the time domain into the frequency domain. The length of each predefined segment can be the same as, or a fraction of, the data symbol length.

The transformed-domain I and Q samples are multiplied in the frequency domain by the complex conjugate of the transformed-domain code samples, and the frequency-domain product is transformed back into the time domain using the inverse FFT function 224. Specifically, for each block of Fourier transformed data (i.e. ADC samples and the conjugated PRN samples for the input signal segment currently being processed) an element by element multiplication is performed and the result inverse transformed (IFFT). As described above, this process is equivalent to performing a time-domain correlation. The inclusion of the complex conjugate 223 in the code signal path means that the process is a correlation rather than a convolution.

In use cases where a substantial Doppler frequency offset can be expected, the tracking correlator can be arranged to obtain the Doppler frequency offset estimated during DSSS acquisition, and remove the estimated Doppler frequency offset from the transformed signal samples in the frequency domain before performing the multiplication.

To sequentially output correlation functions for a plurality of segments of the DSSS signal, the samples from each segment are buffered before being input to the tracking correlator 220 in turn.

The FFT procedure produces a cyclic correlation which is well suited to DSSS signals, which use spreading code sequences that are generally cyclic, i.e. periodically repeating. The resulting correlation gives the complete correlation function including all correlation phases between the two signals.

Although in the present embodiment a FFT function is used to transform samples from the time domain to the frequency domain, and an inverse FFT function is used to perform the inverse transformation from the frequency domain to the time domain, the invention is not limited to FFT-based functions. In general any suitable transform function can be used, for example a non-uniform Discrete Fourier Transform, Discrete sine and cosine transforms, or a Fractional Fourier Transform. The corresponding inverse transform function can be used to convert the correlation results back into the time domain to obtain the correlation function.

The processing functions of the correlators 210, 220 and tracking algorithm can, for example, be split in a pipeline process with coprocessors, such as Graphics Processing Units (GPUs) or Digital signal Processors (DSPs) performing the transforms and inverse transforms, and a Central Processing Unit (CPU) performing the control, carrier phase and code tracking.

Embodiments of the present invention can exploit the availability of detailed correlation functions to provide, for example, improved signal monitoring capabilities, signal quality and channel quality evaluation, mitigation of channel degradation, and/or multipath compensation. For example, signal quality can be monitored by comparing the cross correlation function of the input signal and code replica with that of the calibrated receiver response with no impairment.

Figure 4:
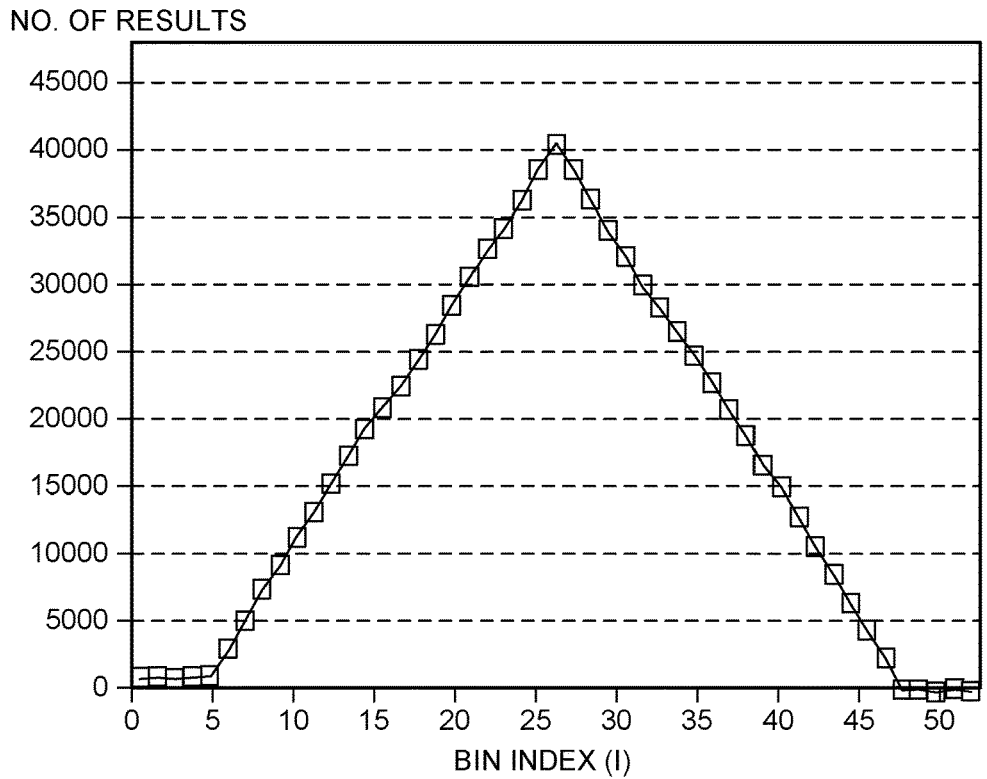
FIG. 4 illustrates an example of a correlation function output by the tracking correlator of FIGS. 2 and 3, according to an embodiment of the present invention.

FIG. 4 illustrates an example of the magnitude of a correlation function output by the tracking correlator 220 of FIGS. 2 and 3. In the present embodiment the received DSSS signal is a Global Position System (GPS) signal modulated by a Coarse/Acquisition (CA) spreading code. The CA spreading code comprises a PRN sequence which repeats every millisecond, and there are 1023 chips per PRN sequence. In the present embodiment the signal and spreading code are sampled at a rate of 20.46 million samples (Msamples) per second. There are therefore 20 samples per chip, and 20460 samples in each FFT and inverse FFT. The correlation function will also have 20460 samples, reflecting all the phases of the spreading code compared to the signal.

The magnitude of the PRN autocorrelation function of the GPS CA code is approximately 30 decibels (dB). FIG. 4 illustrates the correlation function obtained for the above-described parameters. As shown in FIG. 4, the correlation function includes a correlation peak. The index of the correlation bin in which the correlation peak occurs indicates the code phase of the received signal. Also, in the present embodiment, since there are 20 samples per chip there will be 20 early and late correlation bins around the correlation peak, corresponding to code phase differences of up to plus and minus one chip between the DSSS signal and the replica spreading code. At larger code phase differences than ±1 chip, the correlation results will close to zero.

Figure 5:
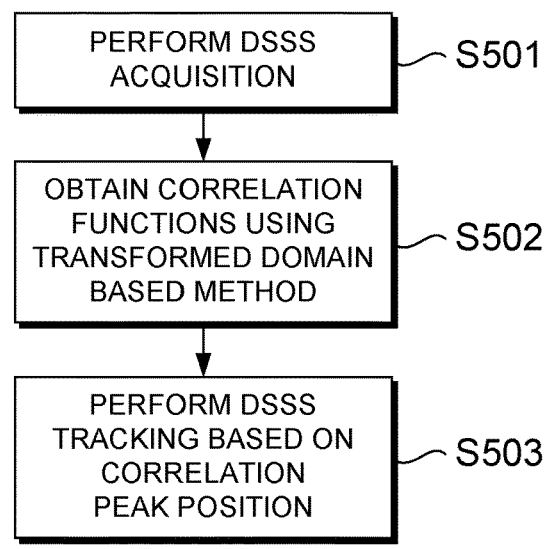
FIG. 5 illustrates a method of demodulating a DSSS signal, according to an embodiment of the present invention.

FIG. 5 illustrates a method of controlling a DSSS receiver, according to an embodiment of the present invention. The method can be performed by, for example, the apparatus shown in FIG. 2. First, in step S501, DSSS acquisition is performed to obtain initial estimates of a frequency offset and a spreading code phase, by correlating the input I and Q samples to the code samples. Then, in step S502, correlation functions are sequentially obtained for each one of a plurality of segments of the received DSSS signal. Next, in step S503, DSSS tracking is performed by comparing the phase and position of a correlation peak in one of the obtained correlation functions to a previous phase and position of the correlation peak.

Figure 6:
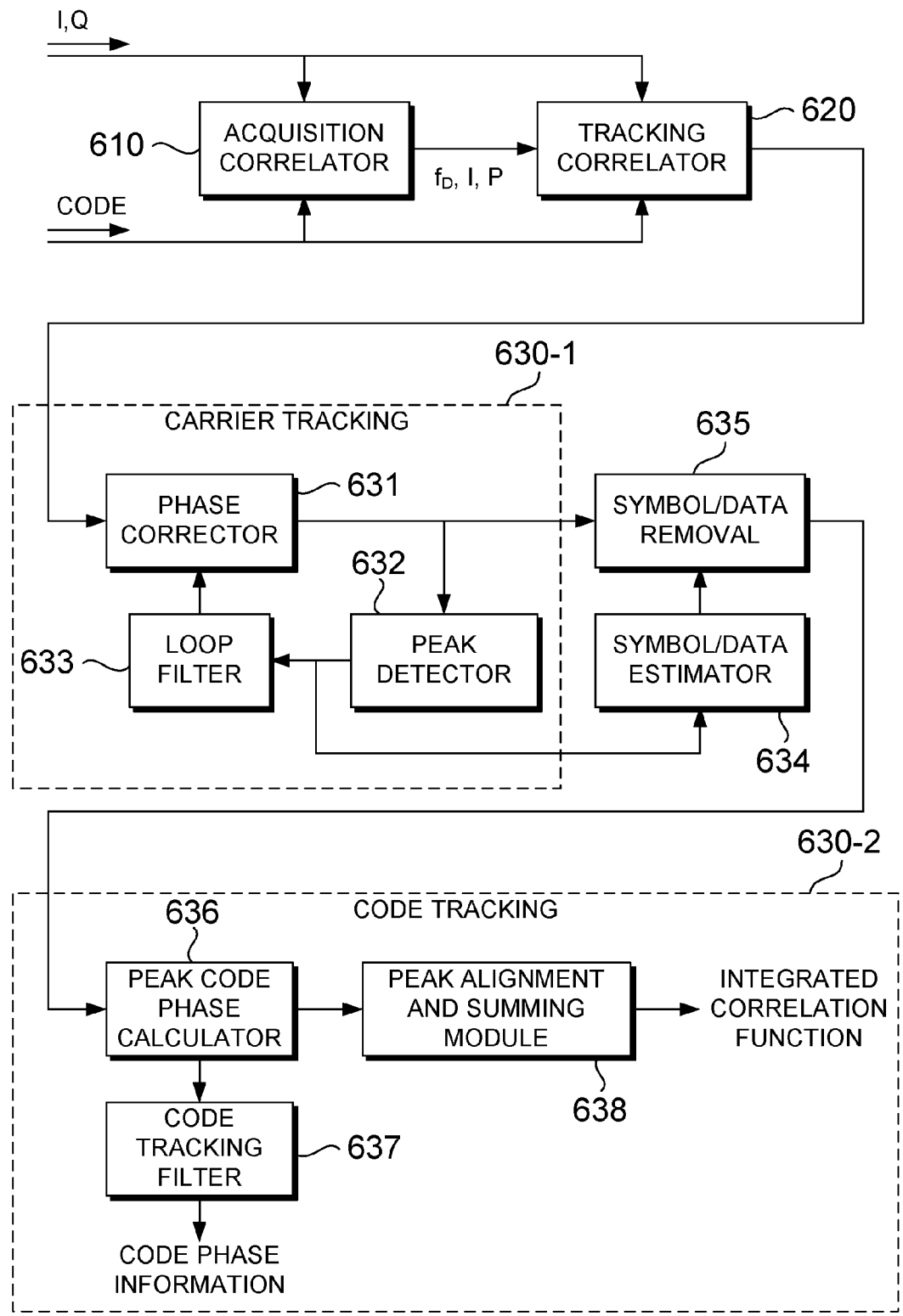
FIG. 6 illustrates apparatus for demodulating a DSSS signal, according to an embodiment of the present invention.

FIG. 6 illustrates apparatus for demodulating a DSSS signal, according to an embodiment of the present invention. The apparatus includes an acquisition correlator 610 and a tracking correlator 620 similar to the acquisition correlator 210 and tracking correlator 220 of FIG. 2. The apparatus of the present embodiment further comprises a DSSS carrier tracking part 630-1 and a DSSS code tracking part 630-2.

To acquire and track a DSSS signal, ADC samples of the received DSSS signal are collected from a hardware receiving section, buffered, and passed to the logical receiving channels. In GNSS receivers, which must track a number of satellites (e.g. 30 satellites), each logical receiving channel tracks a different one of the satellites, using the PRN code of the corresponding satellite.

In the present embodiment the received signal is a GPS signal which is Doppler-shifted due to motion of the satellite relative to the receiver. Doppler frequency offsets in GNSS signals can, for example, be up to ±5 kilohertz (kHz). After the acquisition correlator 610 has performed signal acquisition, both the Doppler frequency and the code phase of the navigation signal are known and the receiving channel enters the carrier tracking phase.

In the carrier tracking phase, ADC samples corresponding to a segment of the received DSSS signal are applied to the FFT-based tracking correlator 620. The segment, on which correlation is to be performed, can have a duration of a fraction or multiple PRN sequences. In the present embodiment, the PRN spreading code is periodic with a repeat period of 1 ms, and samples of a 1 ms segment of the received DSSS signal, corresponding to the duration of one spreading code repeat period, are input to the tracking correlator 620.

Also, as described above with reference to FIGS. 2 and 3, samples of a local replica of the spreading code to be processed by the receiving channel are generated or obtained from a data store. If necessary, the replica spreading code is converted to the same sampling frequency as the ADC input signal samples. The tracking correlator 620 performs a FFT and takes the conjugate of the complex output of the FFT for the replica spreading code. The process of sampling the replica spreading code, performing an FFT and taking the complex conjugate does not have to be performed during every correlation, and can, for example, be performed once at start-up or stored pre-processed in a memory.

Once the correlation has been performed, the correlation function is output to the carrier tracking part 630-1. In the present embodiment one receiving channel is illustrated, which performs DSSS tracking for one satellite out of a plurality of satellites. When it is required to perform tracking in parallel of signals from a plurality of sources, for example GNSS satellites each using a different PRN spreading code for transmission, the initial transform (e.g. FFT) part of the correlation process can be shared amongst the receiving channels for all satellites, which significantly reduces the processing needs of the receiver. This reduces the processing load, since samples from each segment of the received signal to be correlated only have to be transformed once, and can then be shared with each receiving channel.

The carrier tracking part 630-1 uses the phase of the peak correlation bin as input to a phase tracking filter. Specifically, the correlation function is input to a phase correcting module 631 which applies a phase correction, for example by multiplying the correlation function by $e^{-j\theta}$ to apply a phase rotation. Then a detecting module 632 detects the phase of the correlation peak in the corrected correlation function. As shown in FIG. 6, the phase value of the correlation peak is fed into a loop filter 633, which could for example be a standard PLL loop or a Kalman filter, and the output of the loop filter 633 is used to control the phase correcting module 631. Therefore the applied phase correction can be updated based on the detected phase of the correlation peak.

The peak position is characterised by the code phase bin at which the correlation peak exists relative to the PRN code phase. To track the position of the correlation peak, the peak detecting module 632 can be provided with the index (I) of the correlation bin in which the correlation peak was found during the acquisition process, which is the most likely location of the signal correlation peak. The peak bin index (I) can be included in the acquisition parameters stored by the acquisition correlator 610 when the correlation process is successfully completed.

In some embodiments, the accuracy of correlation peak tracking can be further improved by using interpolation over the code phase bins to include fractional offsets. By taking a number of successive correlation peak estimates and performing a linear regression over them, an estimate of the code phase can be made over time. Kalman filters can also be included in the correlation peak tracking, if required.

Because the phase tracking loop applies a phase correction to the output correlation function, as opposed to prior art designs which control the local oscillator which generates the I and Q signal components (see FIG. 1), the phase tracking loop is decoupled from the correlation process.

Also, in the present embodiment the phase value of the correlation peak detected by the peak detecting module 632 is input to a symbol/data estimation module 634, which estimates the current value of the symbol/data with which the received DSSS signal is modulated. After the phase corrector 631 all the signal energy in the correlation function is aligned in phase between correlation function segments. This means that the energy over a single symbol can be summed coherently. After summing the energy over a single symbol, the symbol polarity can be estimated i.e. whether the summed correlation function in-phase component is greater than or less than zero.

The symbol/data estimation module 634 controls a symbol/data removing module 635 to remove the symbol/data from the correlation function, after the carrier phase tracking loop. This provides a coherent correlation function which can be output to the code tracking part 630-2.

By providing a coherent correlation function, the correlation process can be extended after applying carrier correction, by integrating a plurality of complex correlation functions. This will be described in more detail below.

The symbol polarity estimates can be used to determine the receiver navigation data in a GNSS receiver. This can be done simply by finding the synchronisation word which gives the polarity of the symbols and the alignment for the convolutional FEC or the data itself.

As shown in FIG. 6, the code tracking part 630-2 receives the coherent correlation function. A peak code phase calculating module 636 calculates the code phase of the correlation peak, including a fractional offset. The code phase is input to a code tracking filter 637 which provides an estimate of the code phase over time, for use in code tracking. Here, any deviation of the current peak relative to a previous position of the peak provides the change in the code phase, which is itself an indication of the presence of Doppler frequency offset, for example due to satellite movement.

Furthermore, in the present embodiment, multiple complex correlations are coherently summed in a peak alignment and summing module 638. Before summing successive correlation functions, the peak alignment and summing module 638 checks the current position of the correlation peak against a previous position of the correlation peak to determine whether the peak location has moved. If the correlation peak has moved, the new correlation function is shifted to ensure the correlation function is aligned before summing. After being phase aligned, successive correlation functions can be coherently summed to give an integrated correlation function. Aligning and summing correlation functions in this way can increase the integration time, providing enhanced signal recovery.

The output integrated correlation function can be used for various aspects of signal monitoring, including signal quality monitoring (e.g. deformation in the transmitted signal), multipath detection and mitigation, side lobe rejection, spoofing rejection, narrow band interference rejections, meaconing detection and tracking, and/or multi-antenna optimal combining.

Figure 7A:
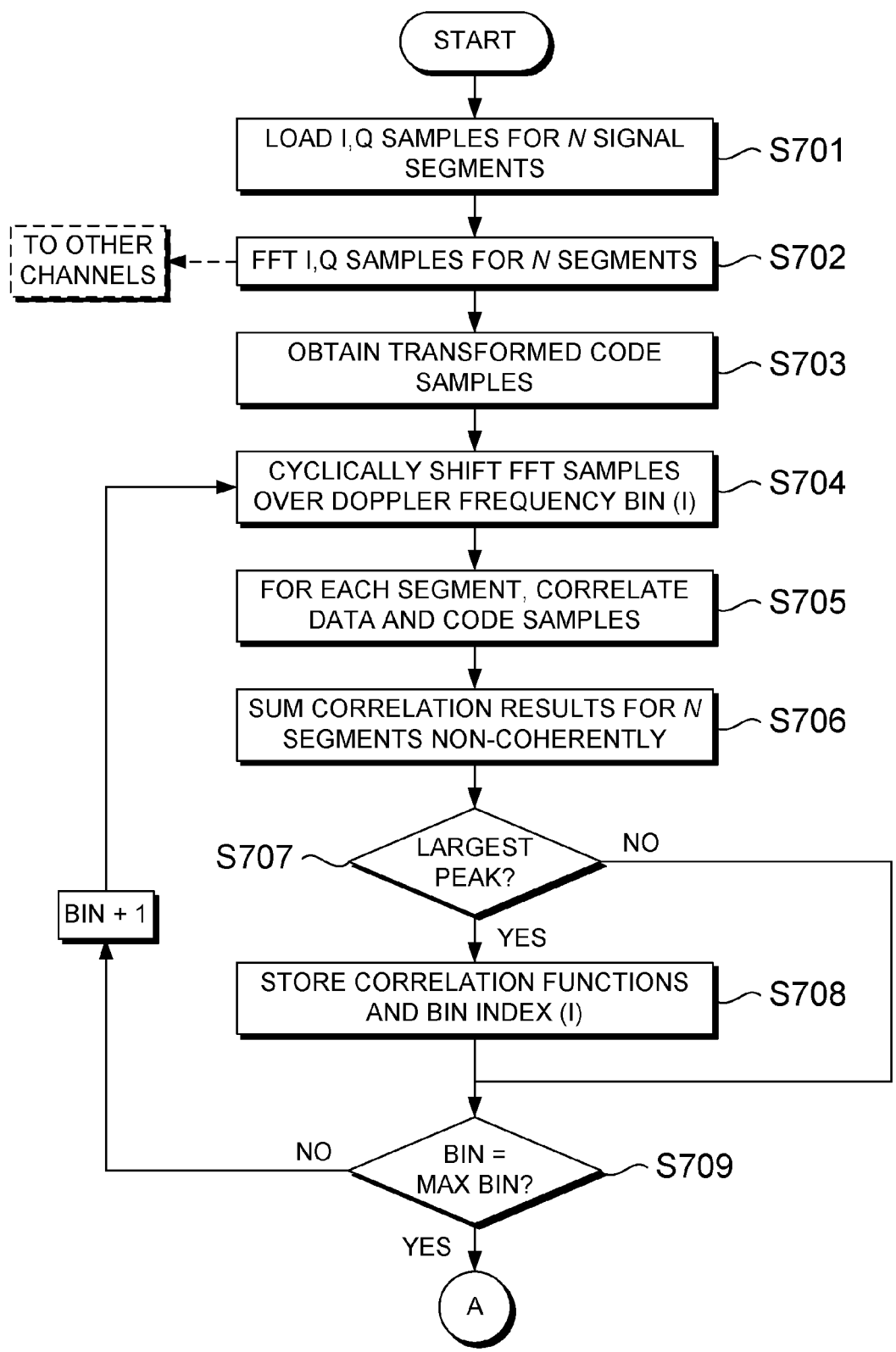
FIGS. 7A and 7B illustrates a DSSS acquisition method, according to an embodiment of the present invention.
Figure 7B:
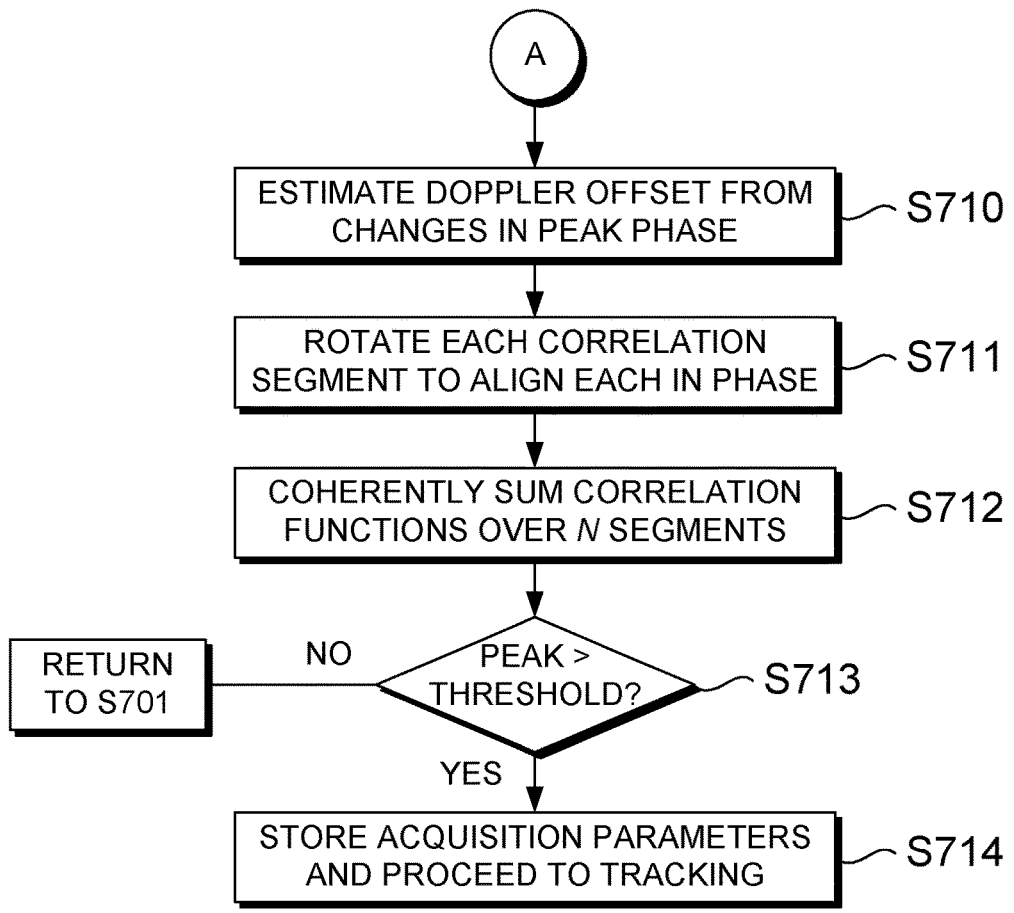

FIGS. 7A and 7B illustrates a DSSS acquisition process using the transformed domain based correlation method, according to an embodiment of the present invention. The method can be used to perform correlation successively over an expected range of Doppler frequency offsets to be searched, over a plurality of spreading codes, and over a plurality of data segments. The method can be used by the acquisition correlators of FIGS. 2 and 6 to acquire a DSSS signal.

In the present embodiment the transformed domain based correlation method is a FFT-based method similar to the one described above with reference to FIG. 3, but it will be understood that the invention is not limited to FFT-based methods and other transform functions can be used.

First, in step S701 the acquisition correlator loads the I and Q samples for a predetermined number N of signal segments, which are segments of the received DSSS signal of predetermined length. For example, each segment can have the duration of one repeat period of the spreading code.

Then, in step S702, a FFT is applied to the I and Q samples for all the signal segments which can be shared with other parallel acquisition or tracking processes. For example, in a GNSS receiver including a plurality of receiving channels each arranged to track a different satellite, the transformed I and Q samples can be shared with the other receiving channels. Next, in step S703, samples of the complex conjugate of the transformed spreading code to be searched are obtained.

Then, in step S704 the acquisition process goes into a loop which tests each of the course Doppler offset possibilities. First, in step S704 the FFT transformed samples of the signal are cyclically rotated over each of a plurality of Doppler frequency bins, each bin corresponding to a different Doppler frequency to be tested. Then, in step S705, a correlation function is obtained between the transformed I and Q samples and spreading code samples. The correlation function obtained in step S705 provides the correlation for the coarse Doppler offset being tested by the current Doppler bin (I). Next, in step S706 the correlation results for the N segments being processed are summed non-coherently, by summing the powers of the individual correlation results. In step S707 it is checked whether the summed correlation peak is larger than any correlation peaks obtained for the other Doppler frequency bins that have already been tested. If a larger peak has already been found, then the process proceeds to step S709 and repeats until all of the Doppler frequency bins have been tested.

After completing steps S704 to S709, the maximum code phase and course Doppler setting has been established, as a consequence of finding the maximum correlation value from the non-coherent addition of the correlation functions. Up to this point the acquisition process is the same as a conventional acquisition process.

In a conventional acquisition process, the largest correlation peak obtained during this process for each segment is normally compared against a predetermined threshold to determine whether a signal has been detected.

However, in the present embodiment, when the largest correlation peak has been found in step S707, then in step S708 the correlation functions obtained using the Doppler frequency bin (I) for the N segments are stored, together with the index (I) of the Doppler bin. Then, once all N segments have been processed, in step S710 a fine Doppler offset is estimated from changes in phase of the correlation peak. Then, in step S711 the correlation functions from all N segments are rotated to align the correlation functions in phase, and in step S712 the correlation functions are coherently added to obtain an integrated correlation function over all N segments. In step S713 it is checked whether the correlation peak is greater than a predetermined threshold. If the test fails, then the process returns to step S701 and loads I and Q samples for new set of signal segments. However, if the predetermined threshold is exceeded, then acquisition is successful. In step S714, the acquisition parameters are stored, and the process continues to the DSSS tracking stage. It should be noted that as this process uses coherent addition of the correlation functions from the segments of data it is significantly more sensitive than the conventional technique. It is possible to accurately find signals which would otherwise not be detectable, with the correct correlation location and fine Doppler estimation of less than one Hertz.

Using the phase of the correlation peak and coherently summing in the acquisition phase provides a significant improvement to the sensitivity of the acquisition process.

Figure 8A:
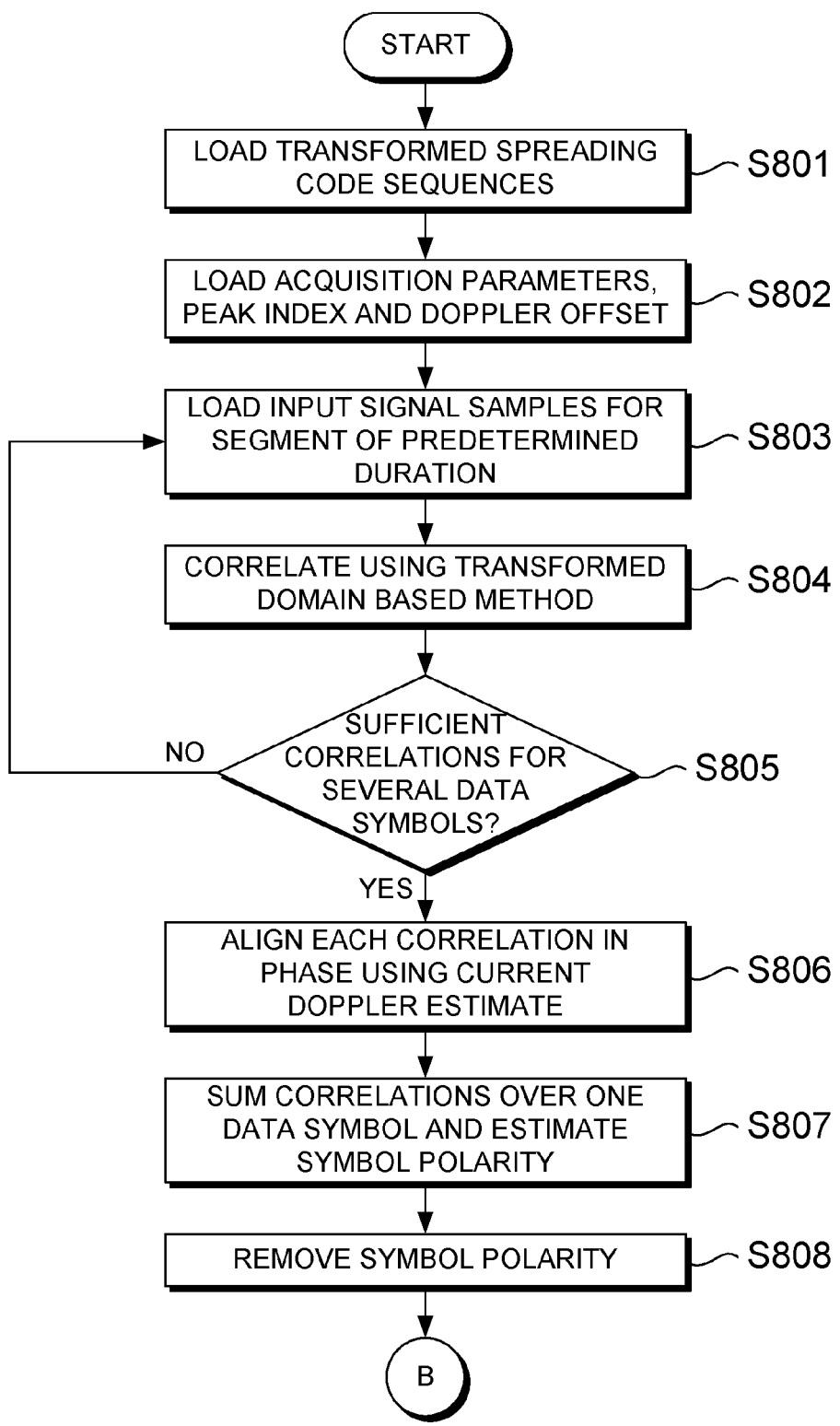
FIGS. 8A and 8B illustrate a DSSS tracking method, according to an embodiment of the present invention.
Figure 8B:
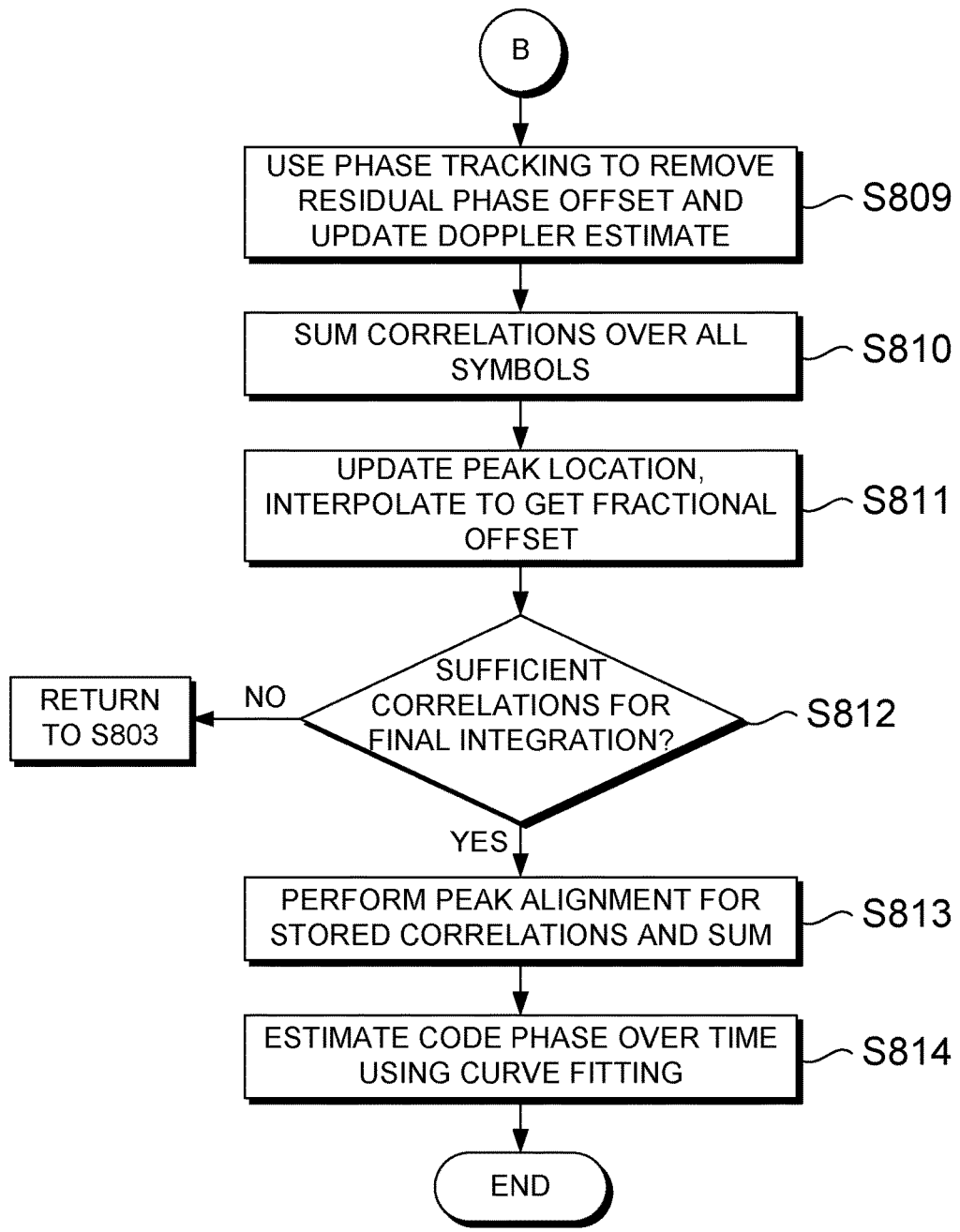

FIGS. 8A and 8B illustrate a DSSS carrier tracking method, according to an embodiment of the present invention. The method can be performed, for example, by the apparatus of FIG. 2 or 6. The method starts from the data acquired in an acquisition process, for example the process of FIGS. 7A and 7B, and then successively refines the carrier phase and phase rate estimates for each correlation function prior to summation. This allows each correlation function to be accurately aligned prior to summation, with the result that very long integration times can be achieved.

In more detail, in step S801 the acquisition parameters, including the peak correlation location and Doppler frequency offset which were determined during acquisition, are loaded. Then, in step S802 the transformed spreading code sequences to be correlated are loaded, and in step S803 input signal samples for a segment of predetermined duration are loaded. The predetermined duration may be referred to as the primary correlation period.

Next, in step S804 the tracking correlation process is performed using a Time and Frequency Transform based correlation method as described above with reference to FIG. 3. The process continues to perform correlations for successive segments of the received DSSS signal until it is determined in step S805 that a sufficient number of correlations have been obtained to cover a predetermined number of data symbols. Depending on the particular embodiment, the DSSS signal may be transmitted with a data symbol duration which is similar to the spreading code repeat period, or which is much greater than the spreading code repeat period. In the apparatus of FIG. 6, steps S801 to S805 are performed by the tracking correlator 620.

Once a sufficient number of correlation functions have been obtained, then in step S806 each of the correlation functions is aligned in phase to the other correlation functions using the current estimate of the Doppler frequency offset value. In the apparatus of FIG. 6, step S806 is performed by the phase corrector 631. Then, in step S807 the aligned correlation functions from one data symbol are summed, and the symbol polarity is estimated. Step S807 corresponds to the functions performed by the phase corrector 631 in FIG. 6, which aligns the correlation functions by applying phase corrections, and by the symbol/data estimator 634, which estimates the symbol polarity.

Next, in step S808 the polarity of the data symbol is removed. In the apparatus of FIG. 6, step S808 is performed by the symbol/data removing module 635. In step S809 a carrier phase tracking algorithm is used to remove any residual phase offset from a plurality of the correlation functions, and to update the Doppler estimate. Step S809 corresponds to the function of the loop filter 633 in FIG. 6.

Once the data symbol polarity and any residual phase offset have been removed, then in step S810 the correlation functions across the predetermined number of data symbols can be summed to obtain an integrated correlation function. Next, in step S811 the new correlation peak location is updated, interpolation is used to obtain a fractional sample offset, and the integrated correlation function, new peak location and fractional offset are stored. Steps S810 and S811 correspond to the functions performed by the peak code phase calculating module 636 and the code tracking filter 637 of FIG. 6.

Then, in step S812 it is checked whether there are a sufficient number of integrated correlation functions to perform a final integration. Here, a second predetermined number of integrated correlation functions may be required. If there are insufficient integrated correlation functions, the process returns to step S803 and continues until a sufficient number are available, and then proceeds to step S813.

In step S813, each of the stored integrated correlation functions is phase-rotated to align the peaks in different ones of the integrated correlation functions, allowing the integrated correlation functions to be coherently summed. In the apparatus of FIG. 6, step S813 is performed by the peak alignment and summing module 638. Finally, in step S814 the code phase over time is estimated using a curve fitting technique, for example linear regression.

In some embodiments, steps S812 and S813 can be omitted, and step S814 can be performed directly on the integrated correlation function obtained in step S810.

In step S803 of FIG. 8A, various approaches are possible when selecting the primary correlation period. For example, the received DSSS signal may be Binary Phase Shift Keying (BPSK) modulated with data bits, and the primary correlation period can be selected in consideration of the duration of one data bit. If there is a phase transition during a correlation period, part of the integration will be performed with one symbol polarity and the rest of the integration will be performed with the opposite polarity. In the worst case scenario, the transition occurs halfway through the correlation period, producing no overall correlation.

If the data period is much longer than the correlation period, this is not a significant problem. For example for GPS the data rate is 50 bits per second (bps), and so the duration of each data bit is 20 ms. In this example, when the correlation period is the same as the PRN spreading code repeat period, which is 1 ms for GPS, the maximum loss that can result from a data transition is $\frac{1}{20}^{th}$ of the signal amplitude, equivalent to less than 0.5 dB. That is, when a total of 20 correlation functions each corresponding to a 1 ms segment are summed to obtained an integrated correlation function across one data symbol, corresponding to a 20 ms portion of the received signal, at most one of the 20 correlation functions will include a data transition. As explained above, if the data transition occurs halfway through one of the 20 correlation functions, that correlation function will not produce a correlation, leading to a reduction of $\frac{1}{20}^{th}$ when the correlation functions are summed over one data period. This is the worst-case scenario, when a transition from 1 to 0, or vice versa, occurs during the 20 ms period covered by the integrated correlation function. Depending on the data transmitted it is possible that there will be no data transition within the integrated correlation function for a 20 ms period, specifically, if the correlation function includes segments from two data bits with the same value, i.e. 11 or 00.

However, in some DSSS signals the data symbol period may be similar to the spreading code repeat period. For some modern GNSS signals including Galileo, the symbol period is the same as the PRN length. In such systems, the primary correlation period should preferably be chosen to have a length which is a predetermined fraction of the PRN repeat period. This provides the advantage that the probability of a data transition occurring in any given segment is reduced. At low signal to noise ratios (SNR), the use of such short segments may mean that several correlation functions need to be summed before being input into the phase tracking algorithm, which in turn may require a good estimation of the Doppler frequency offset.

Embodiments of the invention have been described in which a Time and Frequency Transform based correlation process is used to obtain a correlation function during DSSS tracking. The correlation function can be used as input into a phase tracking algorithm, with the error being used to correct the correlation function. An advantage of this approach is the decoupling of the primary correlation function (e.g. the tracking correlators of FIG. 2 or 6) from the carrier loop. This provides a more robust tracking process which is less sensitive to the carrier tracking estimates, allowing the receiver to track in very low signal to noise environments.

Once the correlation function has been corrected for carrier phase, successive correlations across the complete correlation function can be summed to produce a coherent integration. By tracking the phase of the peak correlation and shifting the correlation function in phase appropriately, very long and even unbounded integration periods can be produced.

Additionally, as described above, for GNSS signals the Doppler frequency offsets can be as much as ±5 kHz. In this scenario, if the FFT correlation is performed over 1 ms intervals, the FFT bins will be 1 KHz. The coarse Doppler frequency offset should be removed from the sampled data in the frequency domain, before multiplication with the complex conjugate of the transform of the reference PRN. In alternative embodiments the course Doppler can be removed by a cyclic shift of the transformed PRN.

However, even after the coarse Doppler offset frequency has been removed, there may be a residual Doppler frequency which can rotate the resulting correlation function by ±π over each successive correlation function. This residual Doppler will reduce the correlation amplitude, due to the changing phase of the signal compared to the local receiver reference. This reduction of amplitude follows a sinc function of the residual Doppler frequency, resulting in a maximum reduction of over half the maximum possible correlation amplitude (3 dB reduction), which occurs when there is a phase change of ±π over successive correlations.

To mitigate this loss of correlation amplitude, in some embodiments of the present invention the frequency resolution of the initial Fourier transform is increased by zero-padding the sampled signal, and increasing the reference length accordingly. By increasing the frequency resolution in this way, the correlation phase change can be limited to ±π/2 or less. This gives a worst-case scenario in which there is a phase change of ±π/2 between successive correlation functions, resulting in approximately 1 dB of implementation loss. Therefore the maximum loss can be improved by the use of zero-padding to increase the frequency resolution of the FFT.

Furthermore, in some embodiments, the DSSS receiver may include two or more separate antenna, RF chains and IF sampling channels. In such embodiments, the receiver can be arranged to time-align the correlation functions from different antennas, and coherently sum the time-aligned correlation functions from the different antennas. This allows the outputs of each antenna to be combined coherently when the antennas are tracking the same signal source, which can provide significant improvements in the presence of interference. Preferably the receiver should time-align the integration functions between the two or more sources to at least the nearest primary correlation moment, or better still to the nearest chip. In some embodiments, the signal-to-noise ratio (SNR) of each antenna can be detected, and the correlation functions can be weighted before summing to give an optimum combination, for example by applying a larger weighting to correlation functions from an antenna with a high SNR.

Embodiments of the invention have been described in which a time and frequency transform based method, such as the one shown in FIG. 3, is used to obtain correlation functions that can then be integrated in the time domain. For example, as described above with reference to steps S806 and S807 of FIG. 8A, for optimum symbol estimation it is best to integrate over a full symbol. In the method of FIG. 8A, this is achieved by establishing the correlation function per forward transform period, before phase-aligning and summing the correlation functions. However, the invention is not limited to integration in the time domain. By performing accumulation over a plurality of forward transforms in the frequency domain, a single inverse FFT can be applied to data from a plurality of forward FFTs. Specifically, each forward transform involves applying the time-to-frequency transformation to a set of samples for a segment of the DSSS signal, and the accumulation is performed for the transformed sets of samples for a plurality of segments of the DSSS signal. This approach reduces the number of inverse FFTs required to generate the complete correlation function in all cases, including a single signal case.

Figure 9:
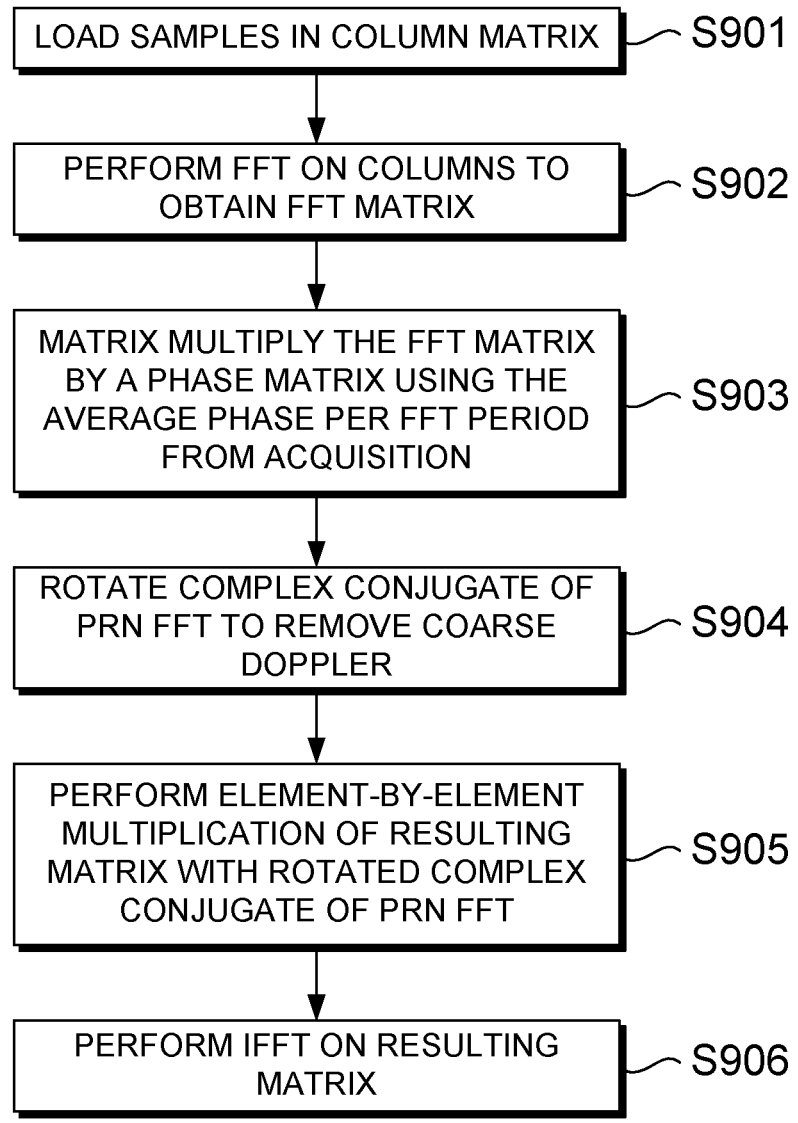
FIG. 9 illustrates a method in which integration is performed in the frequency domain, according to an embodiment of the present invention.

FIG. 9 illustrates an embodiment of the invention in which integration is performed in the frequency domain. A method such as the one shown in FIG. 9 can be used to apply the phase corrections for fine Doppler compensation in the frequency domain, and to obtain the correlation functions by performing integration in the frequency domain before performing the inverse frequency transformation.

First, in step S901 signal samples are loaded in a column matrix, in which each column is the length of the FFT transform period. Preferably, each column is contiguous and enough columns are provided to cover a whole symbol. An example of a matrix S of raw samples in columns is as follows:

$$S = \begin{bmatrix} S_{1,1} & S_{1,2} & \wedge & S_{1,m} \\ S_{2,1} & S_{2,2} & \wedge & S_{2,m} \\ M & M & \wedge & M \\ S_{n,1} & S_{n,2} & \wedge & S_{n,m} \end{bmatrix}$$

Then, in step S902 an FFT is performed on the columns to obtain a frequency-transformed matrix with the FFTs in columns, as shown below:

$$f(S) = \begin{bmatrix} f_1(S_1) & f_1(S_2) & \wedge & f_1(S_m) \\ f_2(S_1) & f_2(S_2) & \wedge & f_2(S_m) \\ M & M & \wedge & M \\ f_n(S_1) & f_n(S_2) & \wedge & f_n(S_m) \end{bmatrix}$$

Next, in step S903 an integrated matrix is obtained by matrix-multiplying the frequency-transformed matrix by a phase matrix. The phase matrix is obtained using the average change in phase calculated during the acquisition process and maintained in the tracking loop. Matrix multiplying by the phase matrix has the effect of applying fine Doppler compensation, whilst simultaneously performing integration across the FFTs in the frequency-transformed matrix. An example of a phase matrix is shown below:

$$\theta = \begin{bmatrix} 1 \\ e^{-j\theta} \\ e^{-j2\theta} \\ M \\ e^{-j(n-1)\theta} \end{bmatrix}$$

Next, in step S904 the complex conjugate of the FFT of the PRN sequence is rotated to remove the coarse Doppler offset established during acquisition. In other embodiments, instead of rotating the FFT of the PRN sequence, a rotation can be applied to the frequency-transformed matrix of samples in order to apply coarse Doppler compensation. However, rotating the PRN is more efficient as it can be performed once and then reused for subsequent correlations. An example of a column FFT of a PRN sequence is as follows:

$$f(PRN) = \begin{bmatrix} f_1(PRN) \\ f_2(PRN) \\ M \\ f_n(PRN) \end{bmatrix}$$

Then, in step S905 the matrix obtained in step S903 is multiplied, element by element by the rotated complex conjugate of the FFT of the PRN sequence, to obtain a Doppler-corrected matrix. Finally, in step S906 an IFFT is performed on the Doppler-corrected matrix obtained in step S905 to obtain a correlation function integrated over the symbol period.

The overall function performed by the steps shown in FIG. 9 can be summarised as follows:

$$C = IFFT(f(S) \theta o (\overline{f(PRN)}))$$

where C is the correlation function, $\overline{f(PRN)}$ is the complex conjugate of the FFT PRN sequence, and o denotes the element-by-element matrix multiplication. This process reduces the processing load by approximately a factor of the number of summed FFTs, which in the above-described example is m FFTs.

In alternative embodiments the order of the matrix multiplication steps S903 and S905 can be commuted. This is necessary when, for example, the PRN sequences are not symmetric or when zero padding is used to remove the symmetry in order to increase the frequency resolution as part of the frequency transform. Furthermore, although a matrix-based method is used in the embodiment of FIG. 9, in other embodiments different mathematical techniques could be used to apply phase corrections and perform integration in the frequency domain.

Integrating in the frequency domain reduces the number of IFFTs, which in turn enables faster tracking since the IFFT is a processing-intense operation. Although FFT and IFFT functions are used in FIG. 9, in other embodiments general any suitable transform function can be used, for example a non-uniform Discrete Fourier Transform, Discrete sine and cosine transforms, or a Fractional Fourier Transform, together with the corresponding inverse transform function.

Whilst certain embodiments of the invention have been described herein with reference to the drawings, it will be understood that many variations and modifications will be possible without departing from the scope of the invention as defined in the accompanying claims.

The invention claimed is:

1. A method of processing a Direct Sequence Spread Spectrum DSSS signal, the method comprising:
    performing DSSS acquisition to obtain estimates of a frequency offset and a spreading code phase; and
    performing DSSS carrier tracking based on the estimated frequency offset and the spreading code phase by:
    using a time and frequency transform based correlation method to sequentially obtain, a correlation function between a DSSS signal segment and a replica of a spreading code, for each one of a plurality of segments of a received DSSS signal, based on the estimated frequency offset and the spreading code phase;
    detecting the phase of a correlation peak in the obtained correlation functions;
    applying a phase rotation to the obtained correlation functions based on the detected phase, to compensate for a Doppler frequency offset between successive ones of the obtained correlation functions and align the correlation peaks in the correlation functions;
    summing the peak-aligned correlation functions over a data symbol; and
    estimating a polarity of the data symbol based on the summed correlation functions, wherein the time and frequency transform based correlation method involves, for each one of the plurality of segments of the received DSSS signal, obtaining a plurality of samples, performing a time to frequency transformation, multiplying the transformed samples by a complex conjugate of the time to frequency-transformed replica of the spreading code, and performing an inverse time to frequency transformation.

2. The method of claim 1, wherein performing DSSS carrier tracking comprises obtaining code and carrier phase estimates, the method further comprising:
obtaining an estimate of the spreading code phase over time based on the code and carrier phase estimates, using a curve fitting process.

3. The method of claim 2, wherein the receiver is a GNSS receiver, and the method further comprises:
obtaining a plurality of pseudoranges using the obtained estimate of the spreading code phase over time; and
processing the obtained pseudoranges in a navigation algorithm to obtain an estimated location.

4. The method of claim 1, further comprising:
receiving a plurality of DSSS signals from spatially separate signal paths;
obtaining, for each of the received DSSS signals, the plurality of correlation functions;
time-aligning the obtained correlation functions from different ones of the received DSSS signals; and
summing the time-aligned correlation functions.

5. The method of claim 1, further comprising:
interpolating between phases of the correlation peaks in successive ones of the correlation functions, to obtain a fractional offset value;
aligning the correlation peaks in the plurality of correlation functions based on the obtained fractional offset; and
summing the peak-aligned correlation functions.

6. The method of claim 1, wherein the DSSS receiver is a Global Navigation Satellite System GNSS receiver comprising a plurality of receiving channels each arranged to track a DSSS signal received from a different one of a plurality of GNSS satellites, and the method further comprises:
sharing each of the transformed signal samples with each one of the plurality of receiving channels.

7. The method of claim 1, wherein obtaining each one of the plurality of correlation functions comprises:
obtaining data samples of the segment of the received DSSS signal; and zero padding the obtained data samples to increase a frequency resolution of the transformed domain based correlation method, and/or
wherein the time and frequency transform based correlation method uses a Fast Fourier Transform FFT, a non-uniform discrete Fourier transform, discrete sine and cosine transforms, or a fractional Fourier transform.

8. The method of claim 1, wherein performing DSSS acquisition comprises:
obtaining a plurality of acquisition correlation functions;
estimating a Doppler offset from changes in phase of the correlation peak within the obtained acquisition correlation functions;
coherently summing the acquisition correlation functions based on the estimated Doppler offset; and
determining that acquisition is successful if a correlation peak in the summed acquisition correlation function exceeds a predetermined threshold.

9. The method of claim 1, wherein the received DSSS signal is a phase shift keying PSK modulated signal, the method further comprising:
obtaining a correlation function for each one of a plurality of data symbols in the received DSSS signal;
estimating, for each one of the obtained correlation functions, a data polarity;
removing the estimated data polarity from each of the obtained correlation functions; and
summing the correlation functions for the plurality of data symbols, after removing the estimated data polarities.

10. The method of claim 9, wherein the plurality of segments each has a length less than a duration of one data symbol, and obtaining the correlation function for each one of a plurality of data symbols in the received DSSS signal comprises:
obtaining correlation functions for each one of a predetermined number of the segments;
aligning the obtained correlation functions in phase, based on a Doppler estimate obtained during the DSSS acquisition; and
summing the predetermined number of aligned correlation functions to obtain an integrated correlation function for said one of the plurality of data symbols.

11. The method of claim 1, wherein the time and frequency transform based correlation method includes one or more operations in the frequency domain to perform accumulation over a plurality of forward transforms.

12. The method of claim 11, wherein the time and frequency transform based correlation method further comprises:
loading the plurality of samples into a column matrix, wherein the frequency transformation is applied to each column of samples in the column matrix to obtain a frequency-transformed matrix;
obtaining a phase matrix based on the phase estimate obtained during DSSS acquisition;
applying the phase corrections and integrating in the frequency domain by multiplying the frequency-transformed matrix by the phase matrix and the complex conjugate of the frequency-transformed replica of the spreading code, to obtain an integrated matrix; and
obtaining an integrated correlation function by applying the inverse frequency transformation to the integrated matrix.

13. The method of claim 11, further comprising:
applying coarse Doppler correction by applying a phase rotation to the complex conjugate of the frequency-transformed replica of the spreading code.

14. Apparatus for receiving a Direct Sequence Spread Spectrum DSSS signal, the apparatus comprising:
means for performing DSSS acquisition to obtain estimates of a frequency offset and a spreading code phase;
means for performing DSSS carrier tracking by using a time and frequency transform based correlation method to sequentially obtain a correlation function between a DSSS signal segment and a replica of a spreading code, for each one of a plurality of segments of a received DSSS signal, based on the estimated frequency and the spreading code phase,
wherein the means for performing DSSS carrier tracking comprises:
a peak detector configured to detect the phase of a correlation peak in the obtained correlation functions,
a phase corrector configured to applying a phase rotation to the obtained correlation functions based on the detected phase, to compensate for a Doppler frequency offset between successive ones of the obtained correlation functions and align the correlation peaks in the correlation functions;

a summing module configured to sum the peak-aligned correlation functions over a data symbol; and
a data symbol estimator configured to estimate a polarity of the data symbol based on the summed correlation functions,
wherein the time and frequency transform based correlation method involves, for each one of the plurality of segments of the received DSSS signal, obtaining a plurality of samples, performing a frequency transformation to transform the samples from the time domain to the frequency domain, multiplying the transformed samples by a complex conjugate of the frequency-transformed replica of the spreading code, and performing an inverse frequency transformation.

* * * * *